Figure 1:
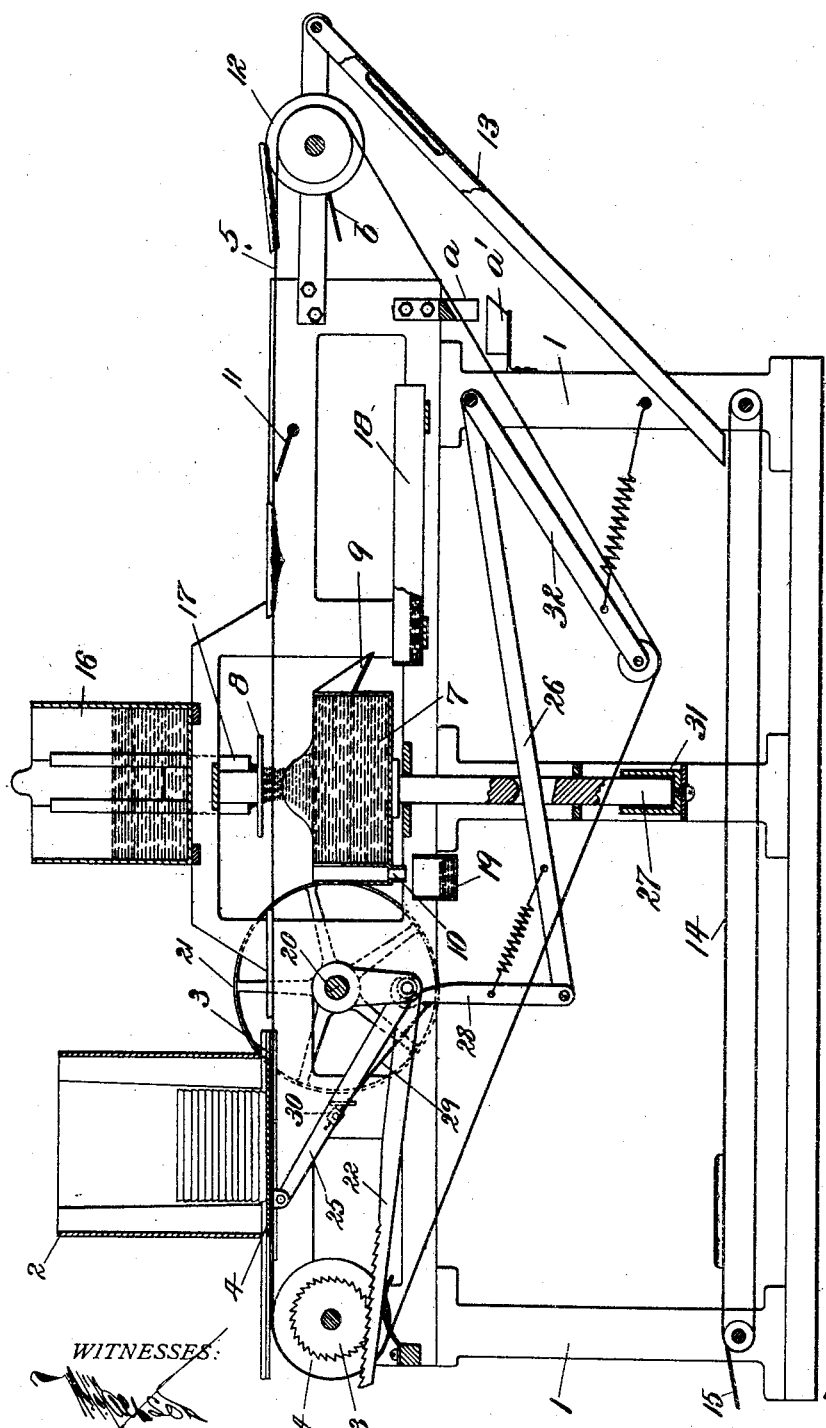

No. 779,652. PATENTED JAN. 10, 1905.
W. S. IVINS.
MACHINE FOR ICING CAKES.
APPLICATION FILED FEB. 11, 1904.

2 SHEETS—SHEET 1.

WITNESSES:
INVENTOR.
Walter S. Ivins.
BY Augustus D. Houghton.
ATTORNEY.

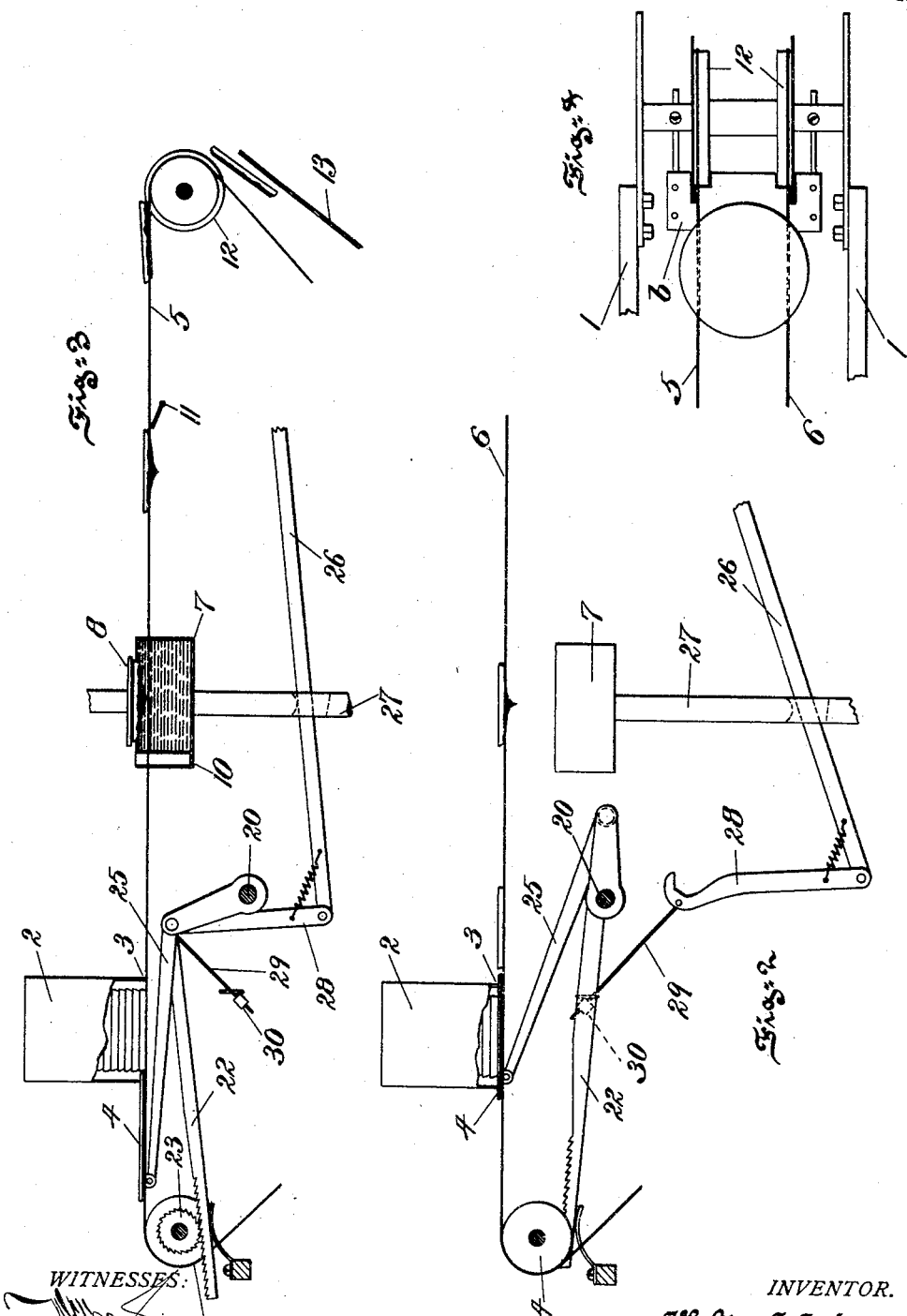

No. 779,652. Patented January 10, 1905.

UNITED STATES PATENT OFFICE.

WALTER S. IVINS, OF PHILADELPHIA, PENNSYLVANIA, ASSIGNOR TO EUGENE IVINS, TRADING AS J. S. IVINS' SON.

MACHINE FOR ICING CAKES.

SPECIFICATION forming part of Letters Patent No. 779,652, dated January 10, 1905.

Application filed February 11, 1904. Serial No. 193,136.

*To all whom it may concern:*

Be it known that I, WALTER S. IVINS, a citizen of the United States, residing at the city of Philadelphia, in the county of Philadelphia and State of Pennsylvania, have invented a certain new and useful Machine for Icing Cakes, of which the following is a specification.

The object of the present invention is to provide a simple, efficient, and reliable machine for rapidly and satisfactorily applying icing to cakes.

To this and other ends hereinafter set forth the invention, stated in general terms, comprises the improvements to be presently described and finally claimed.

The nature, characteristic features, and scope of the invention will be more fully understood from the accompanying drawings, forming part hereof, and in which—

Figure 1 is a side view, principally in section, of a machine embodying features of the invention. Figs. 2 and 3 are diagrammatic views illustrative of the operation of the machine, and Fig. 4 is a top or plan view of the right-hand portion of the machine shown in Fig. 1.

As shown in the drawings, the working parts of the machine are supported by two side frames 1, which are suitably connected together, so as to afford space between them.

2 is a hopper for the reception of the cakes which are to be iced and which may be arranged in a stack or pile. In the front wall of the hopper, near the base thereof, is a slot or opening 3 for the egress of the cakes, which are taken through it one at a time from the bottom of the stack or pile.

4 is a reciprocating pusher which serves to engage the bottom cake of the stack or pile and to push it forward out of the hopper, it being understood that upon its return stroke the pusher simply slides under the pile until it has moved back far enough to let the pile drop and bring the bottom cake into position for being pushed forward by the pusher. Arranged to receive the cakes from the pusher is a traveling conveyer, shown to consist of a pair of wires 5 and 6. These receive the cakes one at a time and carry them forward, pausing in their travel as each cake comes in line with the pan 7. The latter contains the icing and is shown as being vertically movable, so as to rise toward the cake. Above the cake is arranged a platform or submerger 8, so that as the pan 7 rises the lower face of the cake is brought into contact with the icing, and the submerger prevents the cake from floating and insures its proper immersion. The rim of the pan 7 may be notched for the accommodation of the wires. Leakage of the icing through the notches may be taken care of by providing the pan with a spout 9 and with a double wall suitably drained, as at 10.

In Fig. 2 the cakes are shown upon the traveling conveyer and the pan is shown in depressed position.

In Fig. 3 the cake is shown as immersed in the icing.

11 is a scraper for removing surplus icing if any should adhere to the cakes. From the scraper the cakes reach the flanged wheels 12, the low parts of which serve as pulleys for the wires and the high parts or flanges of which serve to lift the cakes from the wires, not only to free them, but also to allow the marks of the wires in the icing to become obliterated, as they will by reason of the consistency of the icing, which causes it to tend to assume a flat form. The cakes in traveling on the flanges are turned over, as shown in Fig. 3, and are received upon a chute or guide 13, by which they may be conducted to an apron 14, which delivers them from the machine—as, for example, at 15.

16 is a reservoir which may be employed for containing a supply of icing and it is provided with a valved passage or conduit 17, through which icing may be supplied to the pan 7.

18 is a receptacle for receiving icing both from the spout 9 and the scraper 11. If desired, the receptacles 18 and 19 may be connected together and of course the icing contained in them can be reused.

The machine is adapted to operate upon cakes of any shape, so long as they may be placed in a stack or pile in the hopper, or, if desired, the cakes may be fed by hand or in any convenient way, just as they may be removed by hand after the icing has been applied to them; but it is of course undesirable to handle cakes any more than it is absolutely necessary.

*a* represents wipers between which the wires travel, and *a'* is a vessel for receiving any icing that may drop from them.

*b* is a scraper which may be carried on the fixed stud upon which the flanged drum revolves and which is appropriately notched for cleaning said drum.

I am aware that various forms and modifications of mechanism may be employed for imparting the described movements to the various parts named; but I will now proceed to describe the mechanism illustrated in the accompanying drawings.

20 is a crank-shaft, which may be driven in any appropriate way—for example, by means of a pulley 21. Connected with the crank of this shaft is a ratchet-bar 22, held up as by means of a spring, into engagement with a ratchet-wheel 23, connected with pulleys 24, over which the wires 5 and 6 run, so that as the crank is turned the ratchet-bar imparts an intermittent motion of rotation in a clockwise direction to the wheels 24, and thus causes the wires to travel also with an intermittent motion.

25 is a link connected with the crank-arm and also with the pusher, so that there is imparted to the pusher the described reciprocating motion.

26 is a link pivoted at one end of the framework and having engagement with the post 27, that carries the pan 7. The other end of this link is fitted with a pivotal spring-actuated arm 28, provided with a hook. This hook engages a stud on the crank-arm during a portion of the revolution of the latter, and when in such engagement it operates to lift the link 26 and with it the pan. However, the hook is provided with a rod 29, which works in a keeper and is provided with a stop 30, so that when the crank is moving in a clockwise direction in Fig. 1 the rod 29 slips through the keeper toward the left and then toward the right until the crank has reached its uppermost position. The stop then prevents further motion of the rod, so that the hook on the link 28 is held and the crank passes out of engagement with it. Thereupon the pan 7 and post 27 descend and the cup or cylinder 31 provides an air-cushion and prevents any undue shock or jar.

32 represents belt-tighteners which serve to keep the wires under proper tension.

It will be obvious to those skilled in the art to which the invention relates that modifications may be made in details without departing from the spirit thereof. Hence the invention is not limited to the apparatus shown in the drawings; but,

Having thus described the nature and objects of the invention, what I claim as new, and desire to secure by Letters Patent, is—

1. A machine for icing cakes comprising the combination of longitudinally-ranging conveyer-belts adapted to underlie cakes resting upon their upper surfaces and having space between them for exposing the cakes, means for intermittently shifting the conveyer-belts, an icing-receptacle wider than the space occupied by the belts, and means for intermittently lifting the receptacle sufficiently to submerge the conveyer beneath the surface of the icing and insure the presence of icing between the cakes and conveyer, substantially as described.

2. A machine for icing cakes comprising the combination of wires for carrying cakes, means for intermittently shifting the wires, an icing-receptacle, means for shifting the receptacle sufficiently to submerge the wires beneath the surface of the icing, and a platform for accelerating the sinking of the faces of the cakes in the icing, substantially as described.

3. In a machine for icing cakes the combination of an icing-receptacle provided with notched walls, cake-carrying wires arranged above the receptacle, means for shifting the receptacle to cause the wires to enter the notches and be submerged in the icing, and devices for maintaining a constant level of icing in the receptacle, substantially as described.

4. A machine for icing cakes comprising the combination of cake-carrying wires and means for imparting an intermittent motion to said wires, a hopper for delivering cakes one at a time to the wires, an icing pan and holder and means for shifting the icing-pan in respect to the holder to submerge the under side of the cakes, and flanged rolls over which the wires travel and which serve to turn the cakes icing side up, substantially as described.

5. A machine for icing cakes comprising the combination of cake-carrying wires and means for imparting to them an intermittent motion, a hopper and pusher and actuating device for feeding cakes one at a time to the wires, an icing pan and holder and operating mechanism for submerging one side of the cake in the icing, and wheels for freeing the cakes from the wires and turning them, substantially as described.

6. In a machine for icing cakes the combination of a group of cake-carrying wires, an icing-pan wider than the group of wires and provided with notches for their reception, and means for shifting the icing-pan to cause the wires to enter the notches and be submerged in the icing, substantially as described.

7. In a machine of the class specified the combination of a cake-conveyer consisting of parallel lengthwise-ranging belts adapted to expose the under side of cakes resting upon them, an open-top icing-pan, and means for shifting one of said elements so as to immerse the belts in the icing and thereby insure the presence of icing between the cakes and belts, substantially as described.

8. A machine for icing cakes comprising belts on which cakes ride, an icing-receptacle, means for immersing the under faces of the cakes in the icing, and flanged wheels of which the low parts serve as pulleys for the belts and of which the high parts serve for turning the iced cakes to free them from the belts and turn their iced faces uppermost, substantially as described.

9. In a machine for icing cakes the combination of an icing-receptacle, means for keeping a constant level therein, cake-carrying belts, and means for immersing said belts beneath the level of icing in the receptacle, substantially as described.

10. A machine for icing cakes comprising the combination of longitudinally-ranging belts upon which cakes rest, means for imparting intermittent motion to said belts, devices for depositing cakes upon said belts, an icing-receptacle beneath the belts, and means for immersing the belts in the icing, substantially as described.

11. A machine for icing cakes comprising a cake-conveyer consisting of longitudinally-ranging belts, means for laying cakes on the face of the conveyer, devices for submerging the belts and one face of the cakes in icing, and belt-pulleys having provisions for freeing the iced cakes from the conveyer, substantially as described.

12. A machine for icing cakes comprising the combination of a conveyer having its upper face adapted to underlie and support cakes, and means for intermittently shifting the conveyer, an icing-receptacle and means for intermittently shifting the receptacle so as to immerse the conveyer in the icing, substantially as described.

In testimony whereof I have hereunto signed my name.

WALTER S. IVINS.

In presence of—
K. M. GILLIGAN,
W. J. JACKSON.